(12) United States Patent
Borovsky et al.

(10) Patent No.: US 8,854,318 B2
(45) Date of Patent: Oct. 7, 2014

(54) MODE SWITCHING

(75) Inventors: Andrew Borovsky, New York, NY (US); John Martin, Atherton, CA (US)

(73) Assignee: Nokia Corporation, Espoo (FI)

( * ) Notice: Subject to any disclaimer, the term of this patent is extended or adjusted under 35 U.S.C. 154(b) by 56 days.

(21) Appl. No.: 12/874,206

(22) Filed: Sep. 1, 2010

(65) Prior Publication Data
US 2012/0223890 A1 Sep. 6, 2012

(51) Int. Cl.
*G06F 3/041* (2006.01)
*G06F 3/0488* (2013.01)

(52) U.S. Cl.
CPC .................................. *G06F 3/04883* (2013.01)
USPC ........... 345/173; 345/156; 345/168; 715/863; 715/864

(58) Field of Classification Search
USPC ................. 345/156–157, 168–169, 173–178; 715/863–864; 708/142–146; 341/22–28
See application file for complete search history.

(56) References Cited

U.S. PATENT DOCUMENTS

| | | | |
|---|---|---|---|
| 5,463,725 A * | 10/1995 | Henckel et al. ............... | 715/776 |
| 5,754,306 A | 5/1998 | Taylor et al. | |
| 5,884,185 A | 3/1999 | Kim | |
| 6,055,439 A | 4/2000 | Helin et al. | |
| 6,249,606 B1 | 6/2001 | Kiraly et al. | |
| 6,628,310 B1 | 9/2003 | Hiura et al. | |
| 6,799,061 B2 | 9/2004 | Jeoung | |
| 6,920,619 B1 | 7/2005 | Milekic | |
| 7,487,467 B1 * | 2/2009 | Kawahara et al. ............ | 715/810 |
| 7,509,140 B2 | 3/2009 | Elomaa | |
| 7,593,000 B1 | 9/2009 | Chin | |
| 7,610,599 B1 | 10/2009 | Nashida et al. | |
| 7,676,767 B2 | 3/2010 | Hofmeister et al. | |
| 7,683,888 B1 | 3/2010 | Kennedy | |
| 7,917,861 B2 | 3/2011 | Boettcher et al. | |
| 8,082,523 B2 * | 12/2011 | Forstall et al. ............... | 715/863 |
| 8,127,254 B2 | 2/2012 | Lindberg et al. | |
| 8,130,206 B2 * | 3/2012 | Lindroos ...................... | 345/173 |
| 8,209,637 B2 | 6/2012 | Chaudhri et al. | |
| 8,341,557 B2 | 12/2012 | Pisula et al. | |
| 8,427,445 B2 | 4/2013 | Kennedy | |
| 8,443,199 B2 | 5/2013 | Kim et al. | |
| 2001/0017934 A1 | 8/2001 | Paloniemi et al. | |
| 2003/0090506 A1 | 5/2003 | Moore et al. | |
| 2004/0061788 A1 | 4/2004 | Bateman | |
| 2004/0210845 A1 | 10/2004 | Paul et al. | |

(Continued)

FOREIGN PATENT DOCUMENTS

EP  1 032 183 A2  8/2000
EP  1 450 248 A1  8/2004

(Continued)

OTHER PUBLICATIONS

International Search Report from International Application No. PCT/FI2011/050739, mailed Dec. 16, 2011.

(Continued)

*Primary Examiner* — Jason Mandeville
(74) *Attorney, Agent, or Firm* — Alston & Bird LLP

(57) ABSTRACT

Based on one or more characteristics of a received translation input, a computing device is switched between two or more states. The translation input may be a touch input, for example a drag operation. The states may relate to locked and unlocked states, idle screens, or other suitable examples.

10 Claims, 15 Drawing Sheets

(56) References Cited

U.S. PATENT DOCUMENTS

| | | |
|---|---|---|
| 2005/0060653 A1 | 3/2005 | Fukase et al. |
| 2006/0026535 A1 | 2/2006 | Hotelling et al. |
| 2007/0016958 A1 | 1/2007 | Bodepudi et al. |
| 2007/0067734 A1 | 3/2007 | Cunningham et al. |
| 2007/0120689 A1 | 5/2007 | Zerhusen et al. |
| 2007/0150834 A1 | 6/2007 | Muller et al. |
| 2007/0150842 A1 | 6/2007 | Chaudhri et al. |
| 2007/0189737 A1* | 8/2007 | Chaudhri et al. ............. 386/125 |
| 2007/0250787 A1 | 10/2007 | Kawahara et al. |
| 2008/0052945 A1 | 3/2008 | Matas et al. |
| 2008/0184112 A1 | 7/2008 | Chiang et al. |
| 2009/0006991 A1 | 1/2009 | Lindberg et al. |
| 2009/0007017 A1 | 1/2009 | Anzures et al. |
| 2009/0064047 A1 | 3/2009 | Shim et al. |
| 2009/0094562 A1 | 4/2009 | Jeong et al. |
| 2009/0172549 A1 | 7/2009 | Davidson |
| 2009/0205041 A1 | 8/2009 | Michalske |
| 2009/0249240 A1 | 10/2009 | Lundy et al. |
| 2009/0264159 A1 | 10/2009 | Hsieh et al. |
| 2009/0267909 A1 | 10/2009 | Chen et al. |
| 2009/0289916 A1 | 11/2009 | Dai |
| 2009/0293007 A1 | 11/2009 | Duarte et al. |
| 2010/0007613 A1 | 1/2010 | Costa |
| 2010/0031152 A1 | 2/2010 | Villaron et al. |
| 2010/0070931 A1 | 3/2010 | Nichols |
| 2010/0081475 A1 | 4/2010 | Chiang et al. |
| 2010/0088643 A1 | 4/2010 | Ota et al. |
| 2010/0095206 A1 | 4/2010 | Kim |
| 2010/0095240 A1 | 4/2010 | Shiplacoff et al. |
| 2010/0125905 A1 | 5/2010 | Samuels |
| 2010/0162182 A1 | 6/2010 | Oh et al. |
| 2010/0205563 A1 | 8/2010 | Haapsaari et al. |
| 2010/0211872 A1 | 8/2010 | Rolston et al. |
| 2010/0231533 A1 | 9/2010 | Chaudhri |
| 2010/0235794 A1 | 9/2010 | Ording |
| 2010/0248689 A1 | 9/2010 | Teng et al. |
| 2010/0257490 A1 | 10/2010 | Lyon et al. |
| 2010/0269040 A1 | 10/2010 | Lee |
| 2010/0293330 A1 | 11/2010 | Maloney et al. |
| 2010/0299598 A1 | 11/2010 | Shin et al. |
| 2010/0306693 A1 | 12/2010 | Brinda |
| 2010/0306705 A1 | 12/2010 | Nilsson |
| 2011/0105193 A1 | 5/2011 | Lee et al. |
| 2011/0154196 A1 | 6/2011 | Icho et al. |
| 2011/0167380 A1 | 7/2011 | Stallings et al. |
| 2011/0187724 A1 | 8/2011 | Oh et al. |
| 2011/0225543 A1 | 9/2011 | Arnold et al. |
| 2011/0271181 A1 | 11/2011 | Tsai et al. |
| 2012/0036556 A1 | 2/2012 | LeBeau et al. |
| 2012/0054680 A1 | 3/2012 | Moonka et al. |
| 2012/0084738 A1 | 4/2012 | Sirpal |
| 2012/0098639 A1 | 4/2012 | Ijas |
| 2012/0124512 A1 | 5/2012 | Lindberg et al. |
| 2012/0319984 A1 | 12/2012 | Borovsky et al. |
| 2013/0147825 A1 | 6/2013 | Martin et al. |
| 2013/0239045 A1 | 9/2013 | Lindberg et al. |
| 2013/0239065 A1 | 9/2013 | Lindberg et al. |
| 2013/0246971 A1 | 9/2013 | Lindberg et al. |

FOREIGN PATENT DOCUMENTS

| | | |
|---|---|---|
| EP | 2 230 623 A1 | 9/2010 |
| EP | 2 256 610 A1 | 12/2010 |
| EP | 2 282 275 A1 | 2/2011 |
| EP | 2 284 646 A1 | 2/2011 |
| GB | 2 310 567 A | 8/1997 |
| JP | 2007-72233 A | 3/2007 |
| WO | WO 00/33570 A1 | 6/2000 |
| WO | WO 2008/116395 A1 | 10/2008 |
| WO | WO 2010/040670 A2 | 4/2010 |
| WO | WO 2011/100623 A2 | 8/2011 |

OTHER PUBLICATIONS

Written Opinion from International Application No. PCT/FI2011/050739, mailed Dec. 16, 2011.
Office Action in U.S. Appl. No. 13/594,238 dated May 29, 2013.
European Search Report for U.S. Appl. No. 13/159,698, dated Sep. 9, 2013.
Mixed molo: 5 Best Things About iOS4 [online] [retrieved Jan. 17, 2012]. Retrieved from the Internet: <URL: http://migmol.blogspot.com/2010/06/5-best-things-about-ios4.html>. (dated Jun. 23, 2010) 6 pages.
Shaky Beginnings: Mar. 2010 [online] [retrieved Jan. 17, 2012]. Retrieved from the Internet: <URL: http://rs250-squid.blogspot.com/2010_03_01_archive.html>. (dated Mar. 9, 2010) 5 pages.
"Flex 4.5—Using Mobile View Transitions"; Downloaded from http://devgirl.org/2011/05/12/flex-4-5-using-mobile-view-transitions/ Published on May 12, 2011.
"LauncherPro Plus Home Screen Transition Effects Effects on CyanogenMod 7—RC 2 Motorola Milestone"; Downloaded from http://www.youtube.com/watch?v=bRcMAOLsBP4; Published on Mar. 6, 2011.
"DevTools for .NET"; Downloaded from http://www.telerik.com/community/forums/windows-phone/transition-control/transition-from-page-to-page.aspx; Published on Nov. 16, 2010.
"Interfaces That Flow: Transitions as Design Elements"; Downloaded from http://www.uxmatters.com/mt/archives/2007/04/interfaces-that-flow-transitions-as-design-elements.php; Published on Apr. 26, 2007.
Sprint Personal Communication Services, User Guide, QUALCOMM QCP-2700/2700F Sony CM-B1201SPR (Jul. 1997) 78 pages.
International Search Report and Written Opinion for Application No. PCT/FI2012/051220, dated Apr. 25, 2013.
International Search Report and Written Opinion for Application No. PCT/FI2011/050776 mailed Dec. 27, 2011.
International Search Report and Written Opinion from International Application No. PCT/IB2008/001662, dated Dec. 15, 2009.
Office Action for Chinese Application No. 2008-800222885, dated Nov. 23, 2011.
Office Action for European Application No. EP 08 776 289.4 dated Apr. 26, 2013.
Office Action for Korean Application No. 10-2010-7002006, dated Aug. 23, 2011.
Office Action for U.S. Appl. No. 13/323,132 dated Jun. 20, 2013.
Office Action for U.S. Appl. No. 13/323,132 dated Oct. 16, 2013.
Office Action for U.S. Appl. No. 13/323,132 dated Feb. 14, 2014.
Office Action for U.S. Appl. No. 13/594,238 dated May 29, 2013.
Office Action for U.S. Appl. No. 13/889,750 dated Oct. 15, 2013.
Office Action for U.S. Appl. No. 13/594,238 dated May 28, 2014.
Office Action for U.S. Appl. No. 13/889,750 dated May 20, 2014.
Office Action for U.S. Appl. No. 13/323,132 dated Jun. 9, 2014.
Supplementary European Search Report for Application No. EP 11 82 1164 dated Apr. 2, 2014.
Office Action for U.S. Appl. No. 13/357,143 dated Jul. 2, 2014.

* cited by examiner

MODE SWITCHING

TECHNICAL FIELD

The present application relates generally to a method, apparatus, and computer program product for switching a device between states based upon the characteristics of a received translation input.

BACKGROUND

Some electronic devices are switchable between different operating states, for example a locked state in which certain functions are disabled, and an unlocked state in which those functions are enabled. Such switching may controlled by a user interface.

SUMMARY

According to a first example, there is provided a method comprising: receiving a translation input; determining that at least one characteristic of the translation input meets at least one predefined criterion; and in response to the determination, switching a computing device from a locked state into an unlocked state.

According to a second example, there is provided apparatus comprising: a processor; and memory including computer program code, the memory and the computer program code configured to, working with the processor, cause the apparatus to perform at least the following: receive a translation input; determine that at least one characteristic of the translation input meets at least one predefined criterion; and switch a computing device from a locked state into an unlocked state in response to the determination.

According to a third example, there is provided a computer program product comprising a computer-readable medium bearing computer program code embodied therein for use with a computer, the computer program code comprising: code for receiving a translation input; code for determining that at least one characteristic of the translation input meets at least one predefined criterion; and code for switching a computing device from a locked state into an unlocked state in response to the determination.

According to a fourth example, there is provided apparatus comprising: means for receiving a translation input; means for determining that at least one characteristic of the translation input meets at least one predefined criterion; and means for, in response to the determination, switching a computing device from a locked state into an unlocked state.

According to a fifth example, there is provided a method comprising: receiving a translation input; determining whether at least one characteristic of the translation input meets a first set of one or more criteria; and if the at least one characteristic is determined to meet the first set of criteria, switching a computing device from a first state into a second state, wherein: in said first state an application is in focus and a first display relating to the application is displayed, and in said second state the application is not in focus.

According to a sixth example, there is provided apparatus comprising: a processor; and memory including computer program code, the memory and the computer program code configured to, working with the processor, cause the apparatus to perform at least the following: receiving a translation input; determine whether at least one characteristic of the translation input meets a first set of one or more criteria; and if the at least one characteristic is determined to meet the first set of criteria, switch a computing device from a first state into a second state, wherein: in said first state an application is in focus and a first display relating to the application is displayed, and in said second state the application is not in focus.

According to a seventh example, there is provided a computer program product comprising a computer-readable medium bearing computer program code embodied therein for use with a computer, the computer program code comprising: code for receiving a translation input; code for determining whether at least one characteristic of the translation input meets a first set of one or more criteria; and code for switching a computing device from a first state into a second state if the at least one characteristic is determined to meet the first set of criteria, wherein: in said first state an application is in focus and a first display relating to the application is displayed, and in said second state the application is not in focus.

According to an eighth example, there is provided apparatus comprising: means for receiving a translation input; means for determining whether at least one characteristic of the translation input meets a first set of one or more criteria; and means for, if the at least one characteristic is determined to meet the first set of criteria, switching a computing device from a first state into a second state, wherein: in said first state an application is in focus and a first display relating to the application is displayed, in said second state the application is not in focus.

BRIEF DESCRIPTION OF THE DRAWINGS

For a more complete understanding of example embodiments of the present invention, reference is now made to the following description taken in connection with the accompanying drawings in which.

DETAILED DESCRIPTION OF THE DRAWINGS

Example embodiment of the present invention and their potential advantages are understood by referring to FIGS. 1 through 11 of the drawings.

Figure 1:
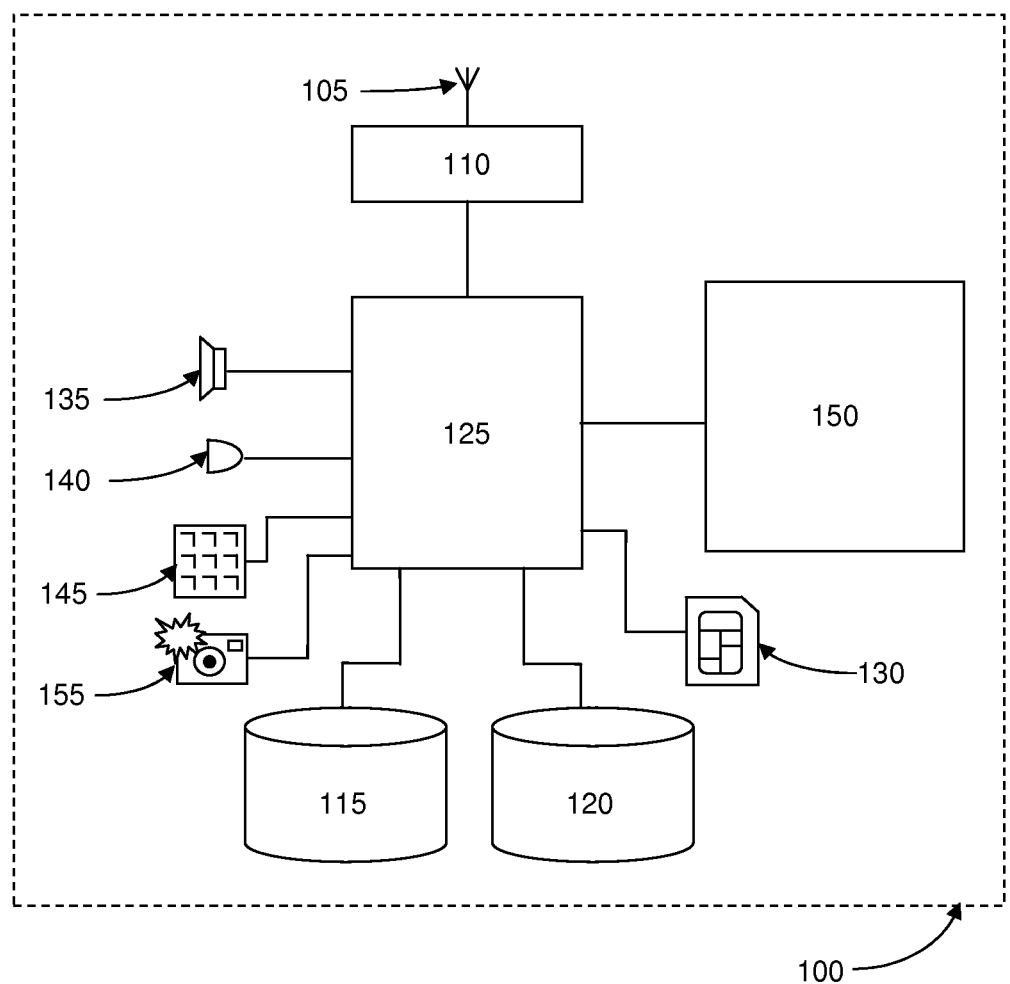
FIG. 1 is an illustration of an apparatus according to an example of the invention.

FIG. 1 illustrates an apparatus 100 according to an example embodiment of the invention. The apparatus 100 may comprise at least one antenna 105 that may be communicatively coupled to a transmitter and/or receiver component 110. The apparatus 100 may also comprise a volatile memory 115, such as volatile Random Access Memory (RAM) that may include a cache area for the temporary storage of data. The apparatus 100 may also comprise other memory, for example, non-volatile memory 120, which may be embedded and/or be removable. The non-volatile memory 120 may comprise an EEPROM, flash memory, or the like. The memories may store any of a number of pieces of information, and data—for example an operating system for controlling the device, application programs that can be run on the operating system, and user and/or system data. The apparatus may comprise a processor 125 that can use the stored information and data to implement one or more functions of the apparatus 100, such as the functions described hereinafter. In some example embodiments, the processor 125 and at least one of volatile 115 or non-volatile 120 memory may be present in the form of an Application Specific Integrated Circuit (ASIC), a Field Programmable Gate Array (FPGA), or any other application-specific component.

The apparatus 100 may comprise one or more User Identity Modules (UIMs) 130. Each UIM 130 may comprise a memory device having a built-in processor. Each UIM 130 may comprise, for example, a subscriber identity module, a universal integrated circuit card, a universal subscriber identity module, a removable user identity module, and/or the like. Each UIM 130 may store information elements related to a subscriber, an operator, a user account, and/or the like. For example, a UIM 130 may store subscriber information, message information, contact information, security information, program information, and/or the like.

The apparatus 100 may comprise a number of user interface components. For example, a microphone 135 and an audio output device such as a speaker 140. The apparatus 100 may comprise one or more hardware controls, for example a plurality of keys laid out in a keypad 145. Such a keypad 145 may comprise numeric (for example, 0-9) keys, symbol keys (for example, #, *), alphabetic keys, and/or the like for operating the apparatus 100. For example, the keypad 145 may comprise a conventional QWERTY (or local equivalent) keypad arrangement. The keypad may instead comprise a different layout, such as E.161 standard mapping recommended by the Telecommunication Standardization Sector (ITU-T). The keypad 145 may also comprise one or more soft keys with associated functions that may change depending on the input of the device. In addition, or alternatively, the apparatus 100 may comprise an interface device such as a joystick, trackball, or other user input component.

The apparatus 100 may comprise one or more display devices such as a screen 150. The screen 150 may be a touchscreen, in which case it may be configured to receive input from a single point of contact, multiple points of contact, and/or the like. In such an example embodiment, the touchscreen may determine input based on position, motion, speed, contact area, and/or the like. Suitable touchscreens may involve those that employ resistive, capacitive, infrared, strain gauge, surface wave, optical imaging, dispersive signal technology, acoustic pulse recognition or other techniques, and to then provide signals indicative of the location and other parameters associated with the touch. A "touch" input may comprise any input that is detected by a touchscreen including touch events that involve actual physical contact and touch events that do not involve physical contact but that are otherwise detected by the touchscreen, such as a result of the proximity of the selection object to the touchscreen. The touchscreen may be controlled by the processor 125 to implement an on-screen keyboard.

The touchscreen and/or other user interface components of the apparatus 100 may be used to detect a translation input. A translation input is a user input having start and a displacement input between the two, define a translation. For example, a touch-drag between two points on a touchscreen or other touch-sensitive surface is a translation input, as would be a click-drag using a mouse or other pointing and selection device.

Figure 2:
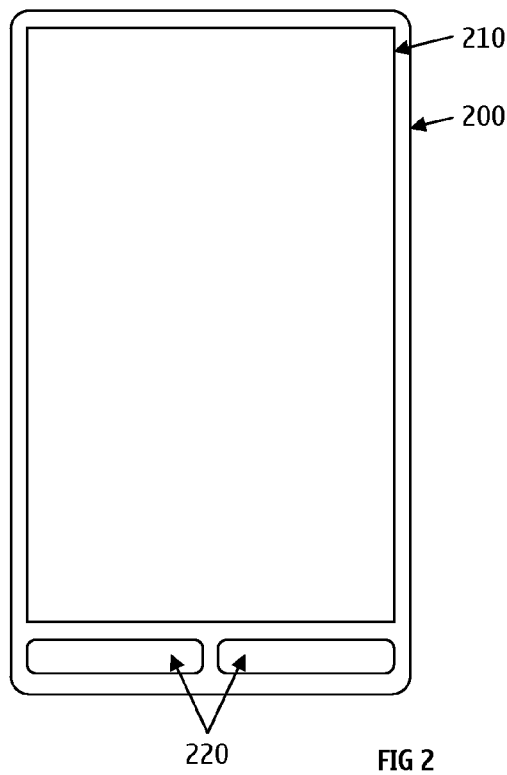
FIG. 2 is an illustration of a device according to an example of the invention.

FIG. 2 illustrates a device 200 that is an example of the apparatus 100 of FIG. 1. The device has a touch screen 210 and hardware buttons 220, although different hardware features may be present. For example, instead of a touchscreen 210 the device 200 may have a non-touch display upon which a cursor can be presented, the cursor being movable by the user according to inputs received from the hardware buttons 220, a trackball, a mouse, or any other suitable user interface component.

Device 200 may be switchable between locked and unlocked states. In the unlocked states one or more user inputs are registered by user input components of the device 200 (e.g. the touchscreen 210 and the buttons 220) and in response to these user inputs the device performs functions that are associated with the inputs. Such actions might be, for example, launching a particular application, displaying a particular menu, or performing other UI navigation or data entry functions.

In the locked mode, the device is configured not to perform at least some of these functions in response to user inputs that would trigger them were the device in the unlocked mode. This may be achieved, for example, by registering user inputs at the user input components, but blocking the device from performing the associated functions. Alternatively, the user input components may be blocked from registering the user inputs when the device is in the locked mode—for example by deactivating the user input components. In some example embodiments a combination of approaches may be used—for example, deactivating only some user input components but blocking the performance of the functions associated with inputs registered by at least some the remaining user input components. In some example embodiments, extra functions are provided while the device is in the unlocked state, and these may be mapped to new user inputs or user inputs for which the unlocked-state functions have been blocked. For example, an extra function may be provided to switch the device 200 to the unlocked state in response to the registration of a particular user input whilst the device is in the locked state.

Figure 3A:
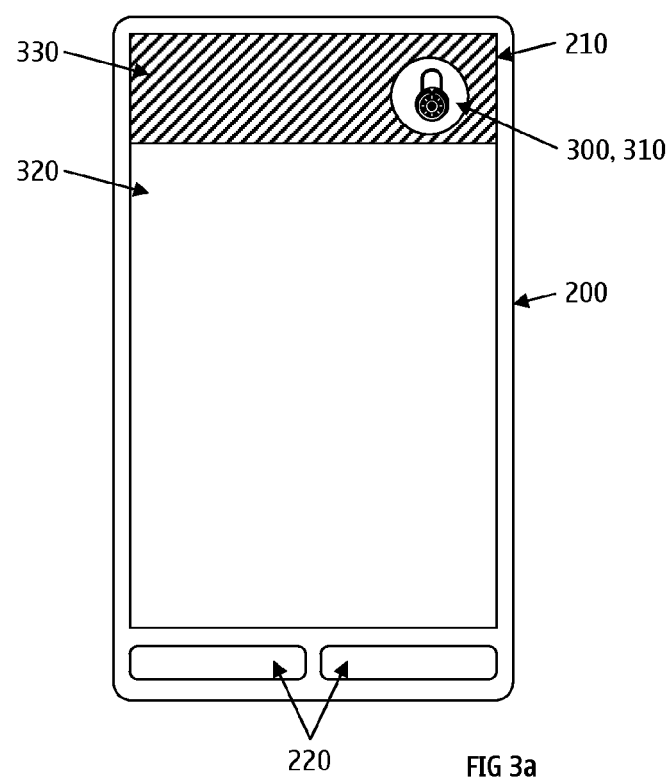
FIG. 3a-c is an illustration of a device according to an example of the invention.
Figure 3B:
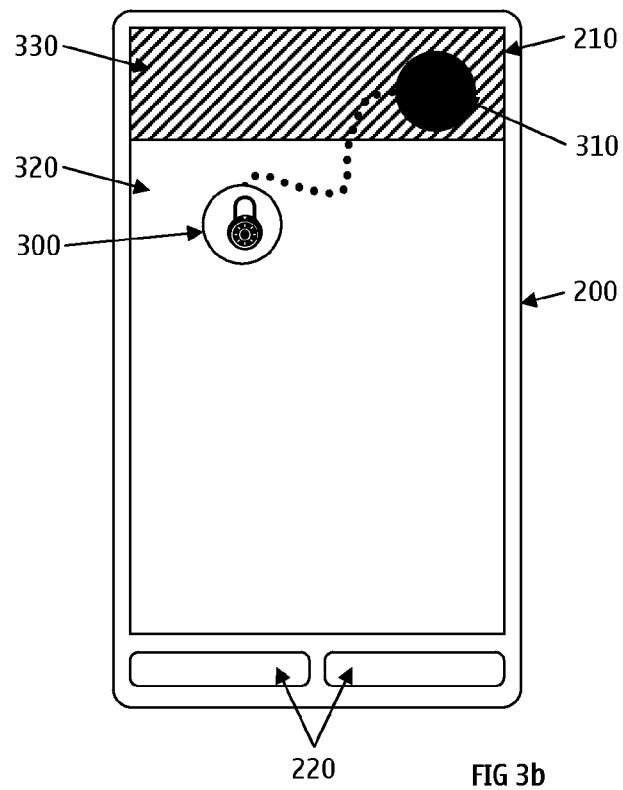
Figure 3C:
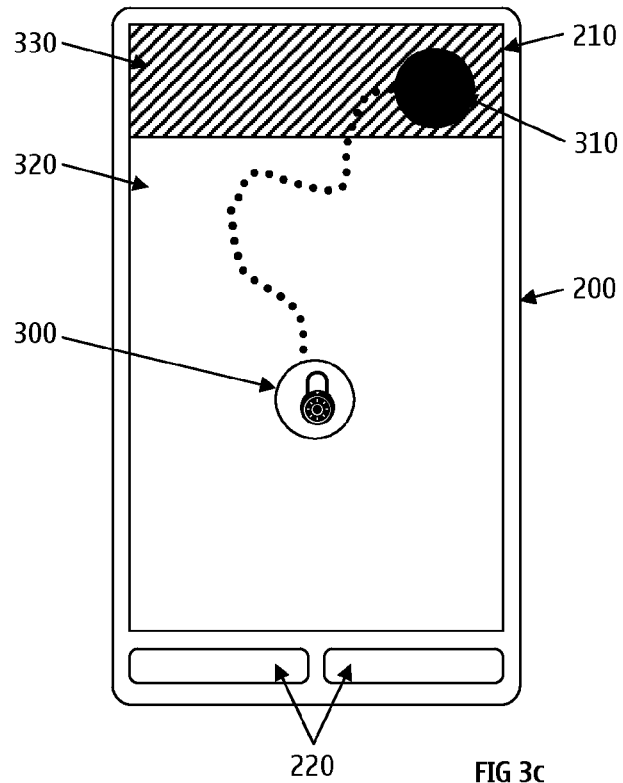

FIGS. 3a-3c illustrate an example of a method of switching the device 200 of FIG. 2 from a locked state into an unlocked state. FIG. 3a illustrates an example of the device 200 in its locked state. The device is displaying an icon 300 that represents the locked state of the device. The icon 300 in the example is an image of a lock, but it may be a different image, text, or any other displayable representation. The icon 300 is displayed within a first locus 310 of the display 210, the first locus in this case corresponding to the position and size of the icon 200, although it could potentially be any area of the display 210.

In some examples, the first locus 310 may be visually or otherwise distinguished from all or part of the rest of the display 210—in this example it is distinguished by the presentation of the icon 300. Other ways to distinguish the first locus 310 would be to draw it in a differentiating colour, or representing the extent of the first locus 310 using haptic feedback. The first locus may be so distinguished whenever the device 200 is in the locked state, or only when certain other criteria are also met—for example when a translation input is detected starting within the first locus 310.

FIG. 3a also illustrates a second locus 320. In the illustrated example, the second locus 330 is remote from the first locus 310, but the two loci may be contiguous. Similarly, there is illustrated a remaining area 330 that consists of the display area that forms neither part of the first locus 310 nor the second locus 320—but in other examples the first and second loci 310 320 together cover the whole display area. Either or both of the first and second loci 310 320 may represent point locations (e.g. a single pixel of the display 210) or two-dimensional (or other multi-dimensional) areas on the display 210. In some examples, the second locus 320 may correspond to a periphery of the display 210, so that a translation input is said to end at the second locus 320 when it leaves the display 210 by crossing its outer edge or coming within a predetermined range of its outer edge. The use of the periphery and other criteria in this manner may, in some embodiments, help the user interface to distinguish between translation inputs that are intended to change the state of the device, and translation inputs that merely correspond to e.g. panning actions within an application.

In FIG. 3b the user has dragged the icon 300 out of the first locus 310 and into the second locus 320. The icon 300 may be dragged using a touch-drag input where a finger or other stylus is contacted with the display 210, brought within a threshold distance of it, or otherwise acts upon the display 210 to commence the drag input, before being translated across the display 210. The drag may end when stylus ceases to act upon the display. Alternatively, a cursor may be controlled by a mouse, trackball, trackpad, joystick, directional buttons, or other controlling means in order, and positioned over the icon 300 or at a predetermined position relative to the icon 300 and moved to perform the translation. In the latter case the drag could be initiated and terminated by pressing and releasing a selection button, or using another suitable user interface component. Other methods of controlling a translation input relative to the icon will may be used, for example drags that are controlled using voice instructions, eye-tracking, and the like. In some examples, the translation input must be actively ended in the second locus 320 by the user (e.g. by the user lifting his finger in the case of a touchscreen drag), but in other examples it is enough that the translation enters or comes within a predetermined range of the second locus 320.

In FIG. 3c the user has completed the drag of the icon 300 to a position within the second locus 210 and has terminated the drag, for example (in the case of a touch screen) by lifting his finger from the display 210. The device determines that the user has dragged the icon 300 out of the first locus 310 and into the second locus 320 and in response to this determination the device is switched from its locked state to an unlocked state.

FIG. 3a-3c illustrate an example embodiment where the unlocking of the device 200 is dependent upon dragging an icon 300 between a first locus 310 and a second locus 320. However, it is not essential that an icon or other object is actually dragged. Instead, in some examples it is enough that a translation input (e.g. a swipe touch gesture, or the movement of a cursor) is determined from the first locus to the second locus. The icon 300 may, however, be used to provide visual feedback to the user during the gesture. Visual feedback may also/alternatively be provided by drawing a visual trail on the display 210, illustrating the path of the translation input as it is moved.

In response to the start of the translation input, other visual indications may, in some examples, be made to the user. For example, user interface elements on the display 210 may move, change colour, or otherwise be emphasised to the user. A visual representation of the second locus may be emphasised, for example by changing its colours and/or by moving it into a convenient position to be designated as the termination point of the translation input. In examples where more than one second locus are provided, the second loci may be moved into an arrangement such as a pie menu for ready access by the user making the translation input.

In the example of FIG. 3a-c, the second locus corresponded to a predetermined area of the screen that did not necessarily have any associated function. FIGS. 4a-d illustrate another example where the second locus has a particular function associated with it.

Figure 4A:
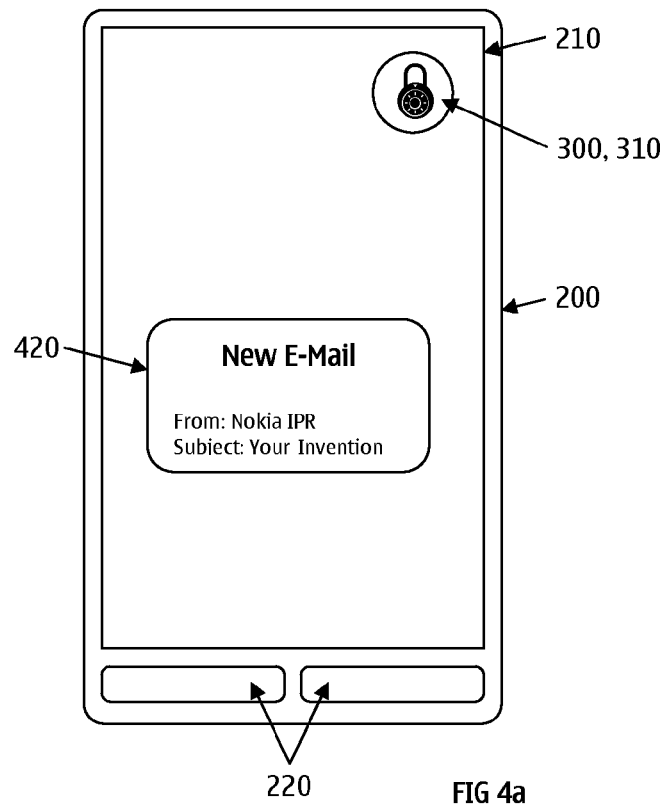
FIG. 4a-d is an illustration of a device according to further example of the invention.

FIG. 4a shows the device 200 displaying an item 420 which is an alert relating to a received e-mail message. In practice, such alert may relate to other events, such as the receipt of an SMS message, a missed call, a calendar event, and so on. Although the example of an alert is used in FIG. 4a-4d, the item may in fact be another displayed element, such as a shortcut to an application or function on the device (e.g. a shortcut to a camera application or a particular website). Regardless of whether it is an alert, a shortcut, or something else entirely, the item has associated with it a function that can be performed by the device. The particular function will be dependent upon the particular item, but for example a shortcut to a website may be associated with the function of opening a browser window and loading that website, and a received message alert may be associated with the function of opening a messaging client and displaying that message.

Figure 4B:
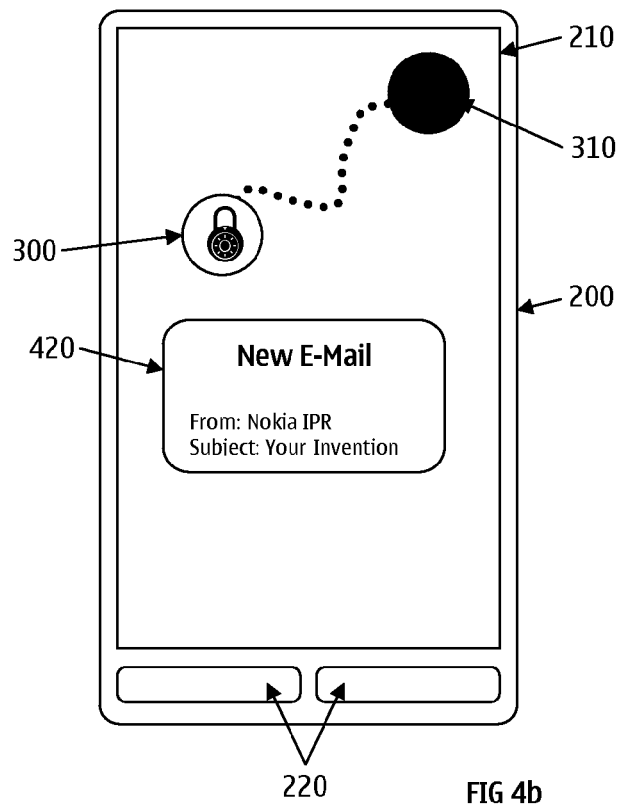
Figure 4C:
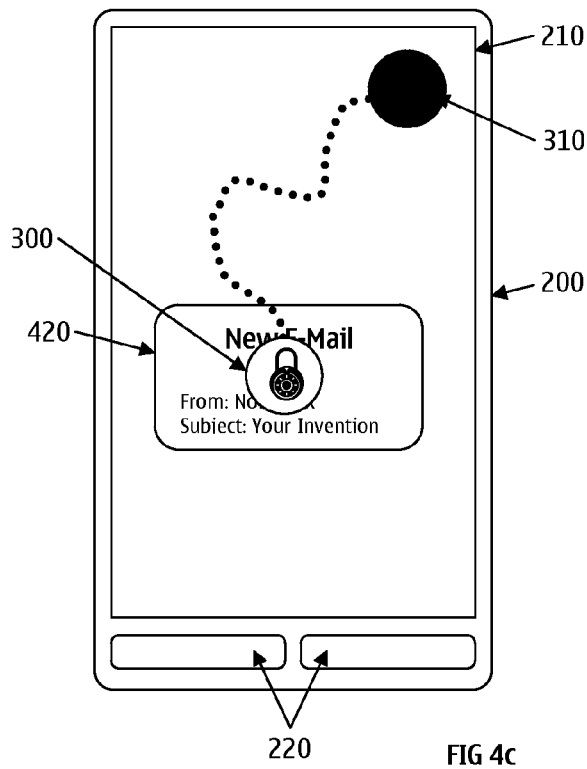

FIGS. 4b and 4c illustrate the dragging of the lock icon 300 away from the first locus 310 and towards the item 420. The second locus is defined relative to the location of the second item, in this example such that the two share the same position and size (although other arrangements are possible).

Figure 4D:
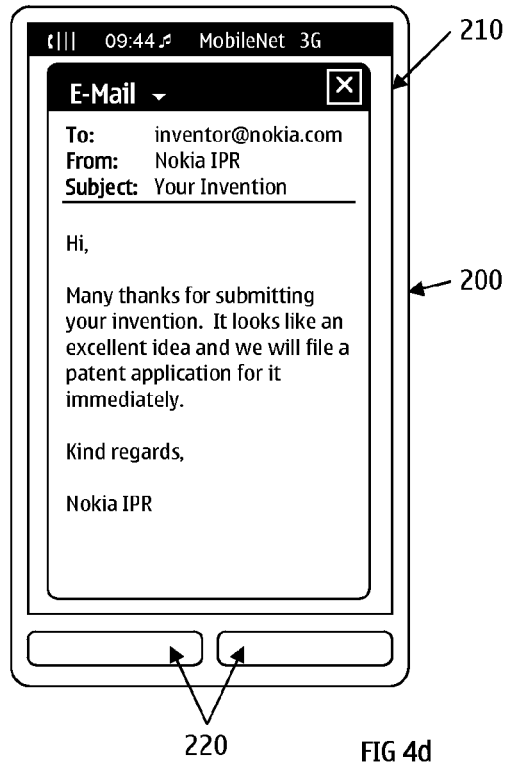

When it is determined that the end point of the drag is within the second locus, the device 200 responds by switching to its unlocked state and performing the function that is associated with the second locus. In the example of FIGS. 4a-4d the associated function is launching the e-mail client and opening the newly received message, and FIG. 4d illustrates this.

Although only one item 420 with an associated function is illustrated in FIGS. 4a-d, more than one item may be present and the items may have different associated inputs. For example, where a message alert and a camera application shortcut are displayed, dragging the icon to the message alert may unlock the device 200 and cause the function of launching the messaging client and opening the message to be performed, while dragging the icon to the camera application shortcut may cause the device 200 to be unlocked and the function of launching the camera application to be performed. Dragging the icon over two or more items in a single translation input may in some example embodiments cause the device 200 to be unlocked and the functions associated with each of those items to be performed.

In some example embodiments, the device 200 is returned to its locked state as soon as the function associated with the item has been completed. In some other example embodiments, the function is associated with a particular application and the device 200 is returned to its locked state once the associated application has been closed (e.g. in the example where the item is a message alert associated with the function of launching a messaging client and opening a message, the device 200 may be returned to its locked state once the messaging client is closed). In some other example embodiments, switching the device to an unlocked state comprises switching the device into a state in which only certain functions are unlocked—for example, in FIG. 4d the e-mail application window relating to the new message may be unlocked for user input, but other functions (e.g. the hardware keys 220 of the device) may remain locked.

Figure 5:
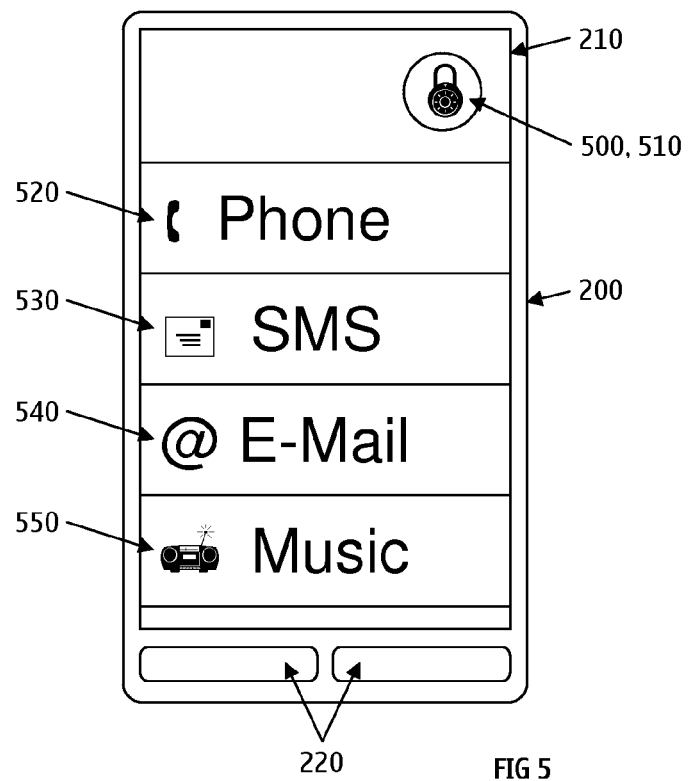
FIG. 5 is an illustration of a device according to an example of the invention.

In some examples, a plurality of second loci may be provided, with different second loci associated with different functions. For example, FIG. 5 illustrates a translation input can be started at a first locus 500 corresponding to an unlock icon, and end at one of a plurality of second loci 520, 530, 540, 560, different ones of the second loci being associated with different functions. In the example of FIG. 5, the second loci are associated with launching a phone application, launching an SMS client, launching an e-mail client, and launching a music application, although other suitable functions may be associated with the loci.

As described in relation to FIGS. 3a-3c, it is not necessarily the case that the translation input in FIGS. 4a-4d is a drag input on an icon, or that the user actively ends the input within the second locus. Instead, other types of translation input may be used in other examples.

Figure 6A:
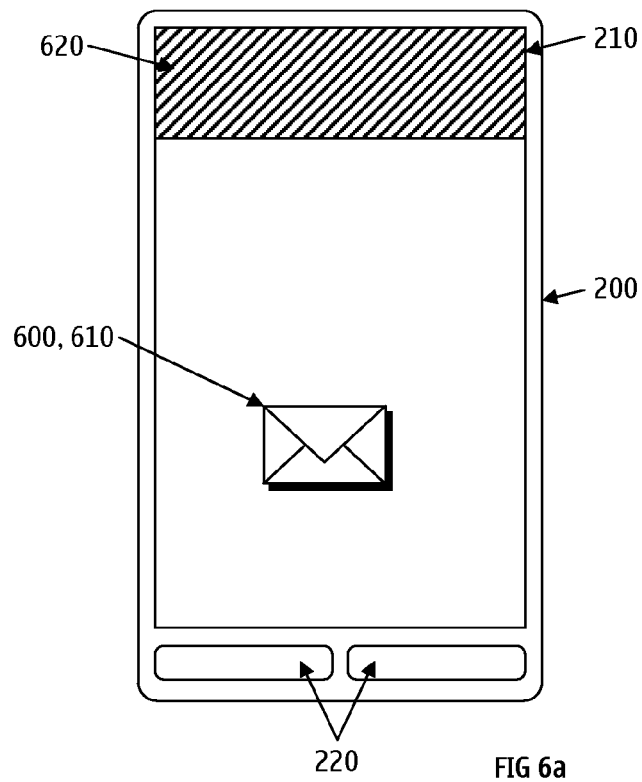
FIG. 6a-c is an illustration of a device according to an example of the invention.
Figure 6B:
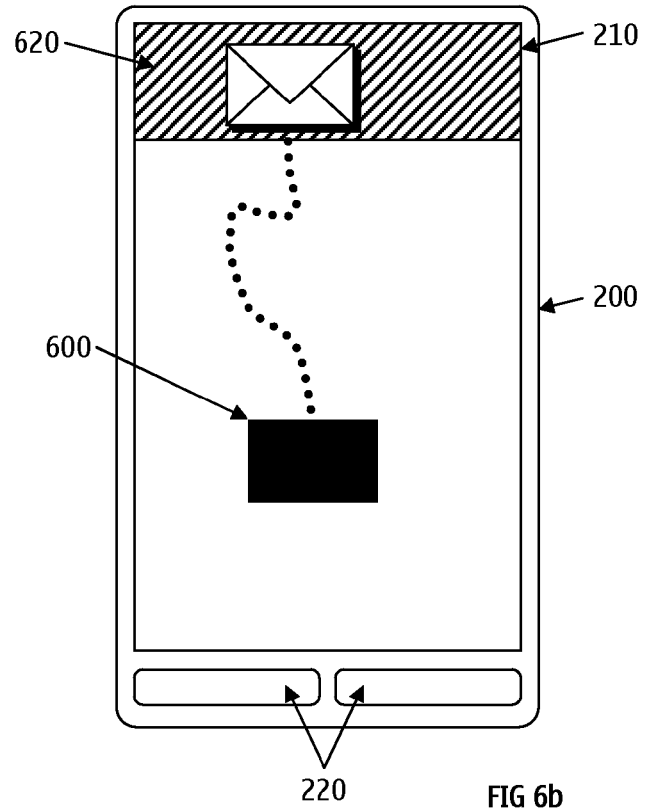
Figure 6C:
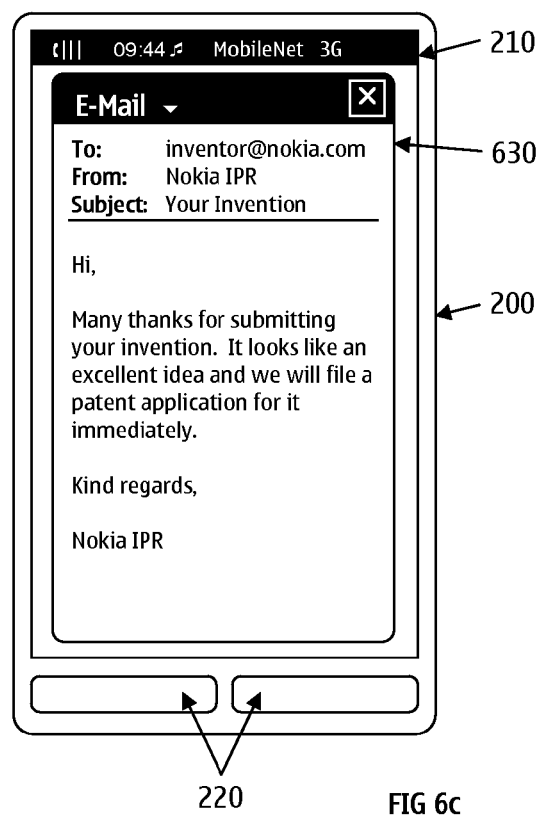

FIGS. 6a-c illustrate an example where rather than the user entering a translation input that ends at a locus associated with a particular function (e.g. launching an e-mail application), it is the locus of the start of the translation input that is associated with the function.

For example, FIG. 6a illustrates a device 200 in a locked state, on whose display 210 is displayed an e-mail notification 610 at a first locus 600 and an unlock area at a second locus 610. The e-mail notification 600 is displayed in response to the reception of a new e-mail message.

In FIG. 6b a translation input has been received from the user between a location within the first locus 600, corresponding to the original position of the e-mail notification 610, and a location within the second locus (the unlock area) 620. In response to this input the notification 610 has been translated to the location within the second locus 620, providing visual feedback to the user.

In FIG. 6c, the user has terminated the translation input at the location within the second locus 620, and in response the device has been switched to its unlocked state, the e-mail client 630 opened, and the new message represented by to the notification 610 has been automatically opened. This is the functionality that was associated with the first locus 610, but only performed in response to the translation input from the first locus 610 to the second locus 620.

FIG. 6a-c is a specific example of an implementation of a more general idea. As described above with respect to other examples, it is not necessary that a notification or other representation be displayed at the first locus 610, or that the unlock area 620 is displayed at the second locus. Similarly, the function associated with the first locus need not be to open an e-mail message, if could be any other function relating to a received message and/or notification, or any other function that the device 200 can perform.

In some example embodiments, a plurality of first loci may be provided, each associated with a different function in an analogue of FIG. 5.

Figure 7A:
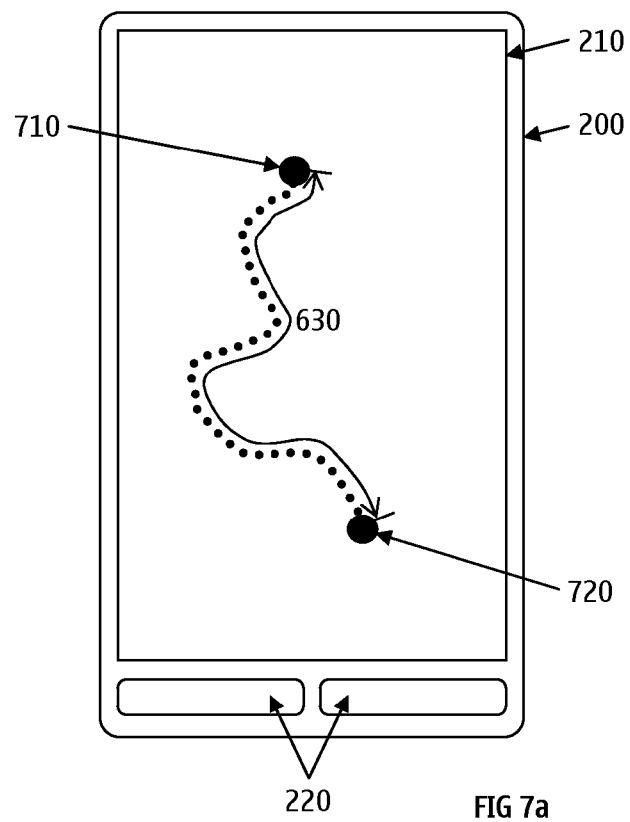
FIG. 7a-c is an illustration of a device according to three further examples of the invention.
Figure 7B:
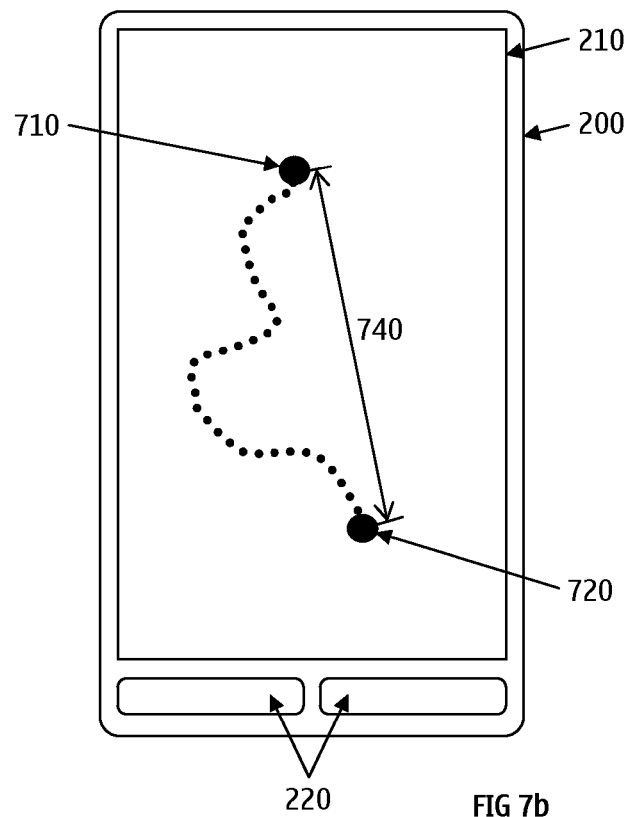
Figure 7C:
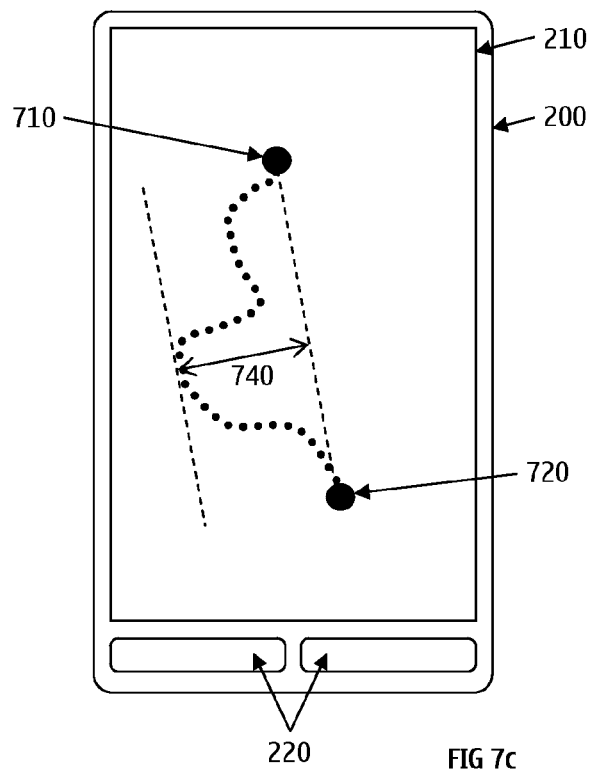

In FIGS. 3a-3c, and 4a-4d, 5, and 6a-c the device was switched between its locked and unlocked states in response to a translation input that started and ended within predefined loci; however, there are other ways in which a translation input can be recognised as a command to unlock the device. FIGS. 7a-c illustrates some of these different ways.

FIG. 7a illustrates a continuous translation input between a start point 710 and an end point 730. The total length 730 along the path of the input is determined and the device 200 is unlocked only if the total length is greater than a threshold amount. The threshold amount may be predetermined, e.g. by the user or the device manufacturer, or it may be determined dynamically, for example as a function of the length of time that has passed since the device was last in its unlocked state.

For example, it may be that a greater length of input is required to unlock the device when it has not locked for a long time (e.g. an hour), whereas a shorted length may be required when the device was unlocked recently (e.g. 10 seconds ago).

In FIG. 7a, it was the total length 730 of the translation input that was determined and compared to a threshold value—this total length being the full path of the input. FIG. 7b shows an example where the straight-line distance 740 between the start and end points 710, 720 is measured and compared to a threshold instead of the total length 730.

In some examples, the end point 720 is defined as the location at which the user actively terminates the translation operation (e.g. ceases to touch the display 210 in the example of a touch drag operation), but in other examples the end point 720 may be a current end point of an ongoing translation input. For example, as the translation input is entered, the distance of the current end point may extend briefly beyond the threshold value from the start point, but then return within it before the translation input terminates. In this example where the distance between the start and current end points is used, the device 200 will switch to its unlocked state when the threshold value is exceeded. However, in the example where the end point 720 is taken to be the location at which the translation input is terminated, the device 200 will remain in the locked state because the distance between the start point 710 and this end point 720 is less than the threshold value.

FIG. 7c illustrates yet another example, in which it is the maximum deviation 740 of a translation input from a straight line path between its start point 710 and end point 720 that is measured. Again, the end point that defines the path may be the current end point, or the end point at which the user terminates the translation input.

In one example, the device 200 is unlocked only if the maximum deviation 740 is less then a threshold value. In another example, the device 200 is unlocked only if the maximum deviation is greater than a threshold value. In other examples, the device 200 is unlocked only if the maximum deviation 740 lies within a particular range of values.

It is possible to measure other characteristics of a translation input in order to determine whether or not the device 200 should be unlocked. Suitable characteristics may include, but are not limited to: the pressure applied to a touch sensitive surface (e.g. a touchscreen) during the translation input; the distance of an object from a touch sensitive surface during the translation input; and the minimum, average, or maximum speeds of the translation input. The device may be unlocked if a selected one or more characteristic is measured to be less than a threshold value, greater than a threshold value, or within a continuous or discontinuous range of values. Similarly the device may be unlocked if a function of one or more measurements of one or more characteristics is determined to be less than a threshold value, greater than a threshold value, or within a continuous or discontinuous range of values. Suitable functions may include mean and other averaging functions.

In some examples, the device 200 may only switch to its unlocked state in the event that more than one of the above conditions are satisfied. For example, it may be required that a translation input has a total path length 730 greater than a first threshold value, in combination with a maximum deviation of less than a second threshold value.

FIGS. 8a-d illustrate an example of the device 200 in which the first locus comprises the entire display 210, or at least a substantially all of the display 210 (e.g. there may be a small status bar or the like that is not within the first locus). A lock screen 810 is displayed on the display, the lock screen 810 indicating to the user that the device 200 is in a locked state.

In some further examples, the lock screen 810 may include portions of the display that are deactivated or otherwise placed in a low-power state (e.g. not backlit) in order to conserve power whilst the device 200 is in the locked state.

Figure 8A:
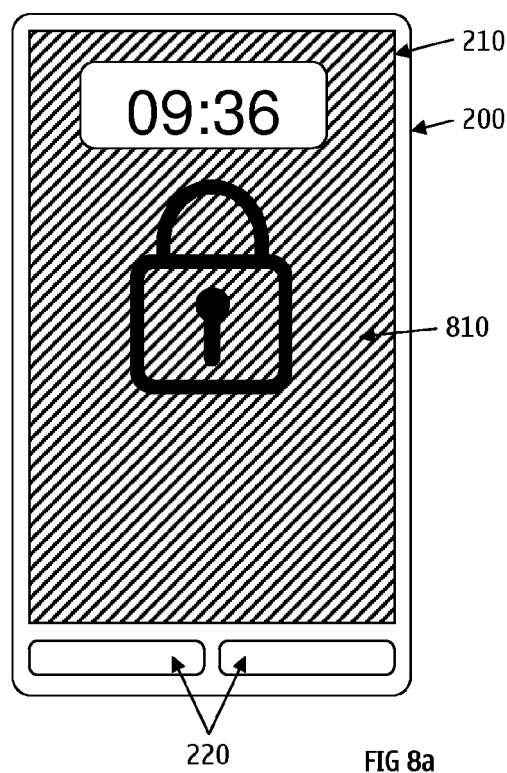
FIG. 8a-d is an illustration of a device according to an example of the invention.
Figure 8B:
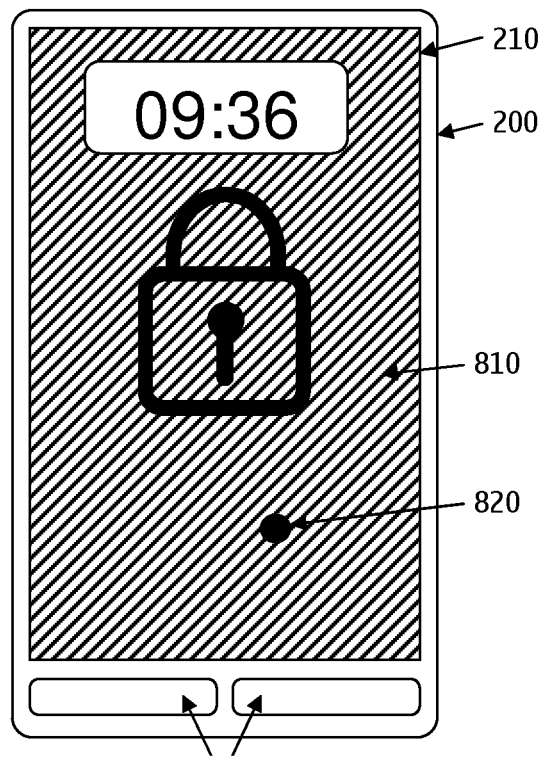

In FIG. 8*b* the user has begun a translation input at a location 820 within the first locus (i.e. substantially anywhere on the display 210).

Figure 8C:
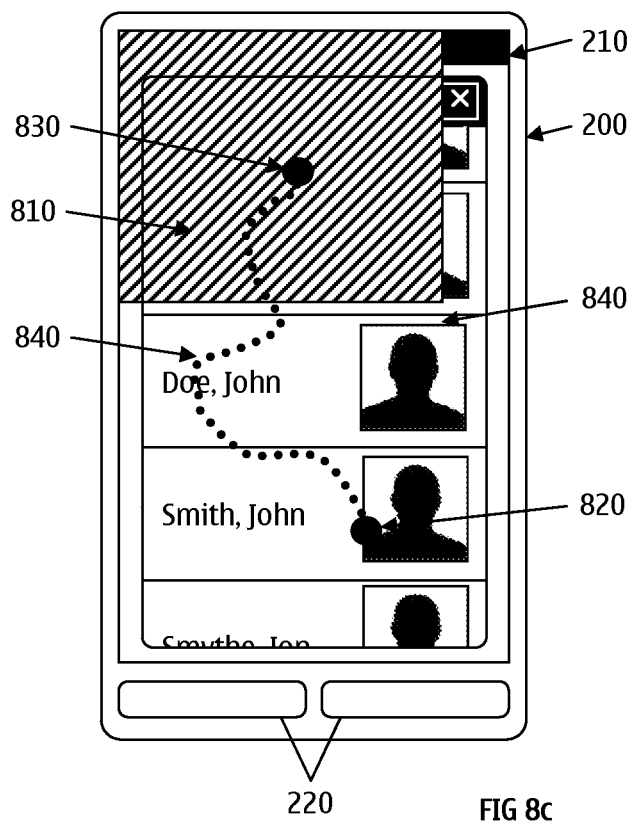

In FIG. 8*c* the user has continued the translation input to location 840, along path 840. As the input moves along the path 840, at least a portion of the lock screen 810 has been translated along the path, revealing a content screen 840 beneath it. Although the content screen may contain content with which the user can interact (e.g. virtual buttons and other user interface components), such interaction may be disabled until such time as the device 200 is switched to its unlocked state.

When the translation input is terminated, a decision is made as based on the input as to whether or not the device 200 should be switched from its locked state into an unlocked state. The decision may be based, for example, on the location of the end of the translation input (e.g. is it within a second locus located at a periphery of the display) and/or a determination that the path 840 exceeds a threshold length.

Figure 8D:
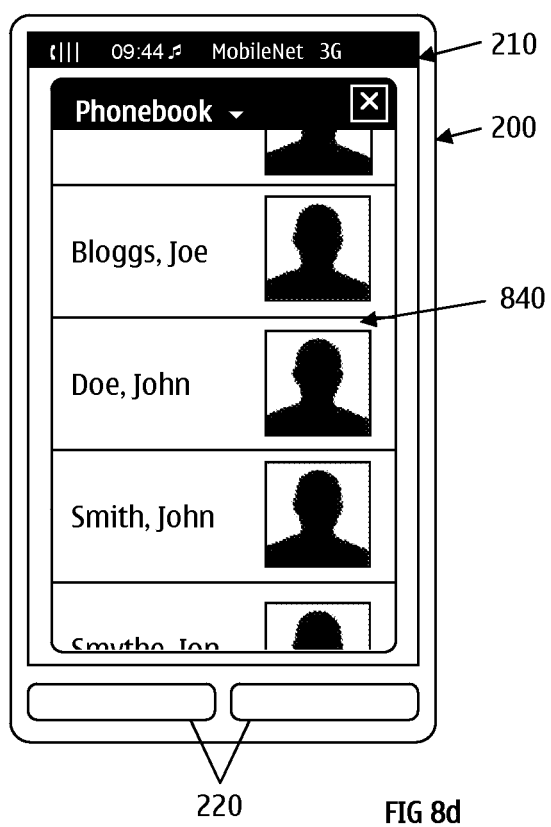

In the event that the device 200 is to be switched to its unlocked state, any remaining visible portion of the unlock screen 810 is removed from the display 210, as shown in FIG. 8*d*. User interaction with the content of the content screen 840 may be enabled.

Conversely, if the decision is made to maintain the device 200 in its locked state, the lock screen 810 may be returned to its original location covering the content screen 840, as shown in FIG. 8*a*, and the device 200 is not switched to its unlocked state.

Example embodiments have been described in which a device is switched, based on the characteristics of a translation input, between locked and unlocked states. However, devices may be switched between other states based upon the characteristics of a translation input.

Figure 9A:
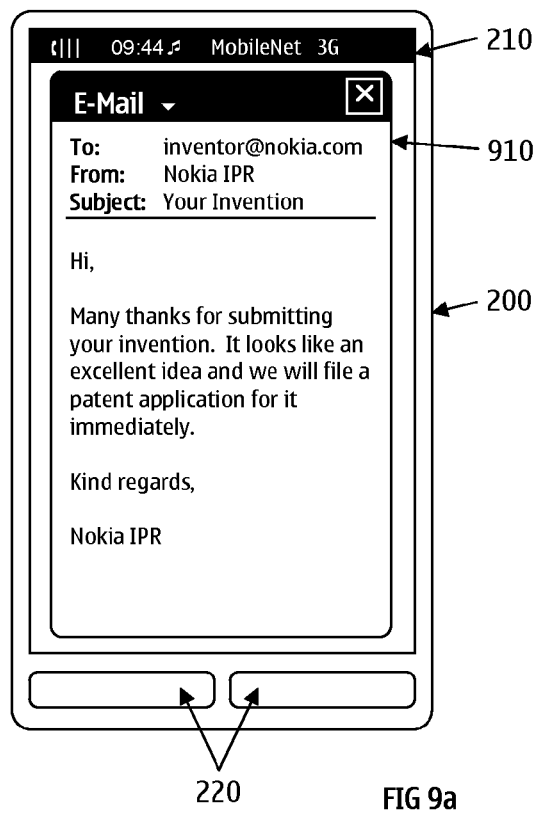
FIG. 9a-c is an illustration of a device according to an example of the invention.
Figure 9B:
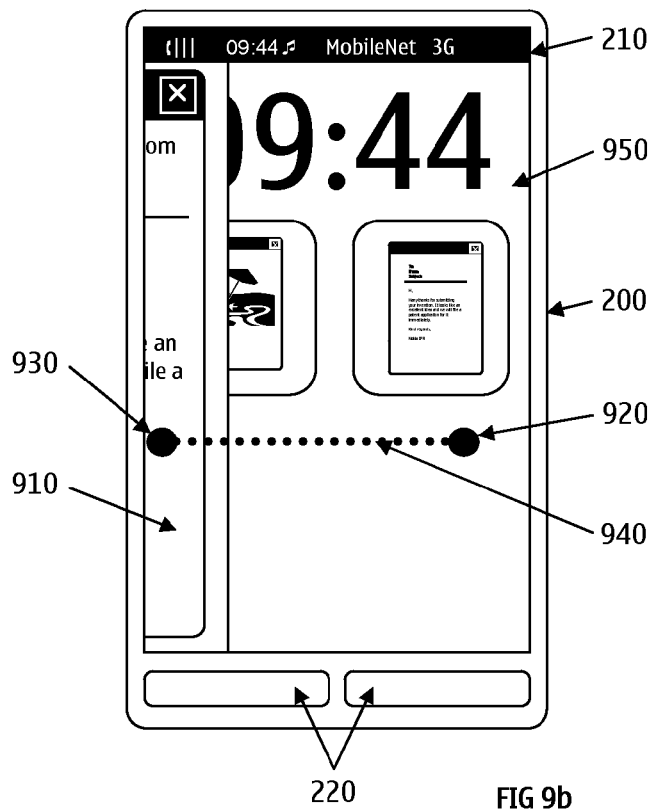
Figure 9C:
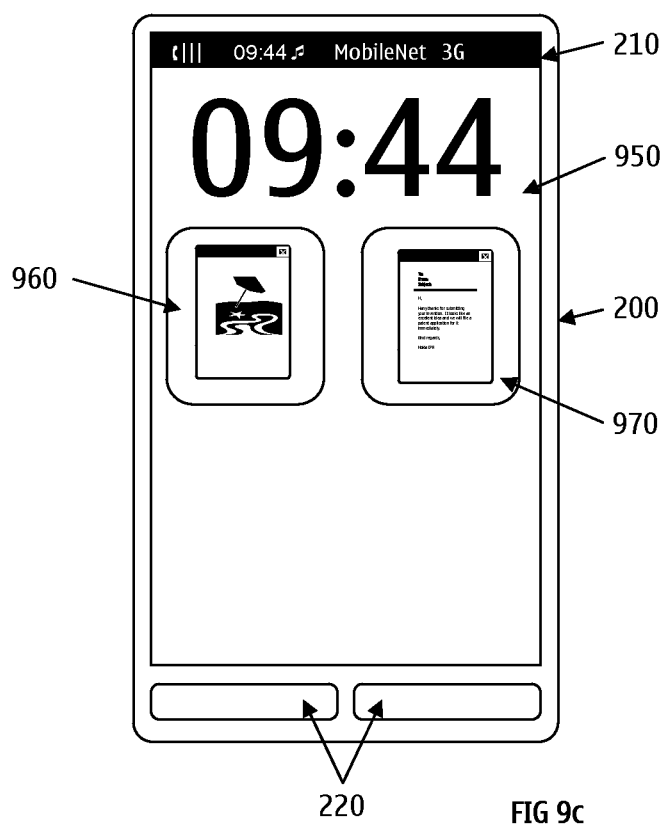

FIGS. 9*a-c* illustrate an example in which the characteristics of a translation input determine the switching of a device 200 between a first and second state. In the first state, shown by FIG. 9*a*, an e-mail application is in focus, an e-mail display 910 associated with the e-mail application filling substantially all of the area of the device's display 210. Although an e-mail application is illustrated, other types of application or any other software component presenting a user interface or other content on the display 210 may be selected. Similarly, the display of the application or other component fills all, substantially all, or only part of the device's display area.

In FIG. 10*b*, the user has initiated a translation input at location 920, for example by touching the display 200 at this location. The translation input is then continued to location 930, along path 940, for example by dragging the finger across the display to location 930.

As the translation input is extended along path 940, the e-mail display 910 may be translated along the same path. Such a translation is shown in FIG. 9*c*. As the e-mail display 910 is translated, it reveals an idle screen display 950 beneath it.

An idle screen, sometimes known as a "home screen" is a display that provides a root navigation level within a device's user interface. It may, for example, be displayed when no applications are running, or when no applications are currently in focus. Because of the root nature of the home screen, it is commonly used to display the current time, upcoming calendar events, event notifications, and other information relating to the device and/or its content. An idle screen, or a home screen, may also be referred to by the more general term "root navigation display". A root navigation display is a display that lies at the root of a navigation session—in other words, other displays may be closed/hidden to work backwards to the root navigation display, but there is no further scope to navigate backwards from the root navigation display. The root navigation display may be thought of as residing at the most fundamental level in a tree structure of potential displays.

Although an idle screen has been selected for the purposes of illustration, other function may be selected in practice. For example, the idle screen may be replaced by a task manager, a main menu (i.e. a menu from which applications may be launched), or any other suitable display.

Based on the characteristics of the translation input, it is determined whether the device is to be switched from its first state (in which the e-mail application is in focus) into a second state. In the second state, the idle screen (or other suitable function) is in focus, and the e-mail application is out of focus and in some example embodiments is terminated. Suitable characteristics are described above, in relation to the other examples.

If it is determined that the device 200 is not to be switched from the first state into the second state, the e-mail display 910 is returned to cover the idle screen display 1010 (as shown in FIG. 9*a*) and the e-mail application remains in focus.

However, if it is determined that the device is to be switched from the first state into the second state, then any remaining visible portion of the e-mail display 1010 is removed from the display 210, and the idle screen display 950 replaces it. Any components in the idle screen display 950 that are capable of user interaction may be enabled in response to the switch to the second state. This is illustrated in FIG. 9*c*.

The example idle screen display 950 of FIG. 9*c* includes user-selectable representations 960, 970 of applications that are running on the device but are not currently in focus. These include a representation 970 of the e-mail application that was in focus in the first state. A suitable representation may be based upon a screenshot of the e-mail display 910 immediately prior to its loss of focus, or a live representation of the e-mail display 910 (i.e. a representation that continues to be updated as the e-mail display 010 would be, were it in focus).

In an example embodiment a selectable representation is based on information other than a screenshot of a represented application. For example, there may be a subset of information associated with the application that may allow a user to recognize the application. For example, a selectable representation of an instant message conversation may be based on information associated with a participant of the conversation, such as a name, and image, and/or the like, a representation of the last message of the conversation, and/or the like. In such an example, information associated with the instant message conversation may be omitted from the selectable representation, such as previous messages, controls, and/or the like. In another example, a selectable representation of a telephony application may be based on information associated with a participant in a call, such as an image, name, and/or the like, a call duration indicator, and/or the like. In such an example, information associated with the telephony application may be omitted from the selectable representation, such as controls, keypad indications, and/or the like. Without limiting the scope of the claims in any way, at least one possible technical advantage of basing the selectable representation on a subset of application information is reducing the amount of information comprised in a selectable representation.

In an example embodiment, the device generates the selectable representation based on a subset of information so that at least part of the information associated with the represented application is omitted from the selectable representation. The device may generate the selectable representation based on a determination of which subset of information may allow a user to recognise the application. The determination of the subset of information may be performed by the device based on at least one characteristic of the application. For example, the device may determine the subset of information based, at least in part, on a type associated with the application. For example, the device may determine that the subset of information for a selectable representation of a messaging application should include participant information and information associated with the most recent message. In another example, the subset of information may be pre-determined. In such an example, the subset of information may be determined by a setting, by programming, by a table, and/or the like.

In response to a user selection of the representation 1070 of the e-mail application, the focus may be restored to the e-mail application by switching the device 200 from the second state back to the first state.

In example embodiments where switching from the first to second state terminates the application in focus in the first state, the representations 960, 970 in the idle screen display 950 may include a representation of the terminated application. Selecting the representation of the terminated application in such cases may cause the application to be re-launched. In some further example embodiments, the application may be re-launched with the same context that it had when it was terminated, effectively returning the device 200 back to its first state.

In some examples performing a translation input when the device is already in the second state may cause the device to re-enter the first state, or to switch to a different state entirely. For example, when more than one In further examples, different characteristics of the translation input may cause the device to be switched into different states in which another display is presented on the display. The other display may relate to a settings menu, an alternative idle screen, a main menu, a different root navigation display, a messaging or other application, or any other suitable function of the device. For example, a translation input in a first direction may cause a display relating to a second state to be uncovered and the device to be switched to the second state, whilst a translation input in a second direction causes a display relating to a third state to be uncovered and the device switched to that third state. In some examples, a translation input in a particular direction may cause a predetermined application to be launched, or function to be performed. For example, a drag gesture towards the top of the display may cause the device to launch an e-mail application, whereas a drag towards the right hand side of the display may cause the device to be placed in a silent mode.

If the device is already displaying a root navigation display (for example an idle or home screen) when the translation input is received, the device may be switched to a state that is associated with a different root navigation display. This switching may be circular so that if the translation input is repeated a sufficient number of times then the state of the device eventually returns to the originally displayed root navigation display. Such functionality may find application in examples where the device is configured to present more than one homescreen, amongst others examples.

In examples where the device is configured to present multiple root navigation displays and the translation input has the effect of switching the device from an application to one of these root navigation displays, the choice of root navigation display (and therefore of the second state) may be determined to be the root navigation state from which the application was directly launched (e.g. by selecting an option associated with the application in the root navigation display). Where the application has not been directly launched from a root navigation display but instead from another application (e.g. where a web browser has been launched by selecting a hyperlink embedded in a message displayed by an e-mail application) then the second state may be determined to be the state in which that other application is running, or the root navigation display from which the other application was itself launched (either directly, or via a chain of other applications).

Similarly, where multiple root navigation displays are available, switching from a state in which an application is running need not necessarily involve switching to a the root navigation display from which that application was launched. Instead, the switch may be to a different root navigation display (e.g. the most recent root navigation display to be displayed by the device).

Figure 10:
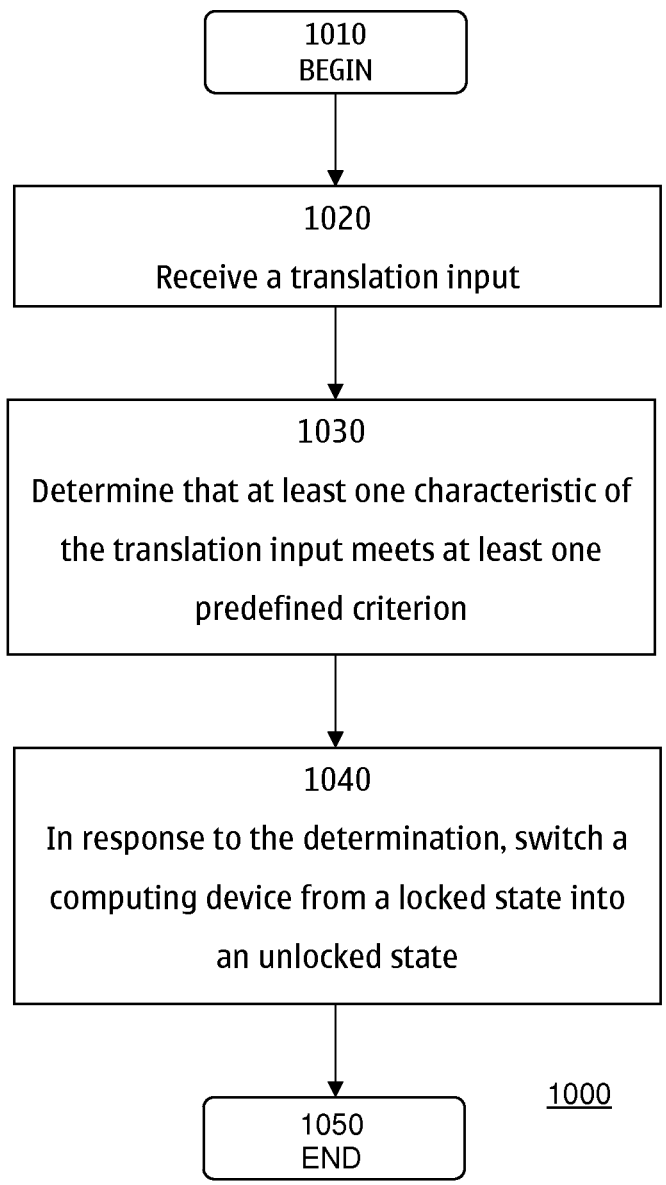
FIG. 10 is a flow chart illustrating a method according to an example of the invention.

FIG. 10 illustrates an example method 1000 for implementing functionality described above. On beginning 1010 the method starts with the reception 1020 of a translation input, for example a drag operation on a touch screen. The method then determines 1030 that a at least one characteristic of the translation input, for example the length of the input or the location of its start and end points, meets at least one predefined criterion, and in response to that determination a computing device is switched 1040 from a locked state into an unlocked state. The method then ends 1050.

Figure 11:
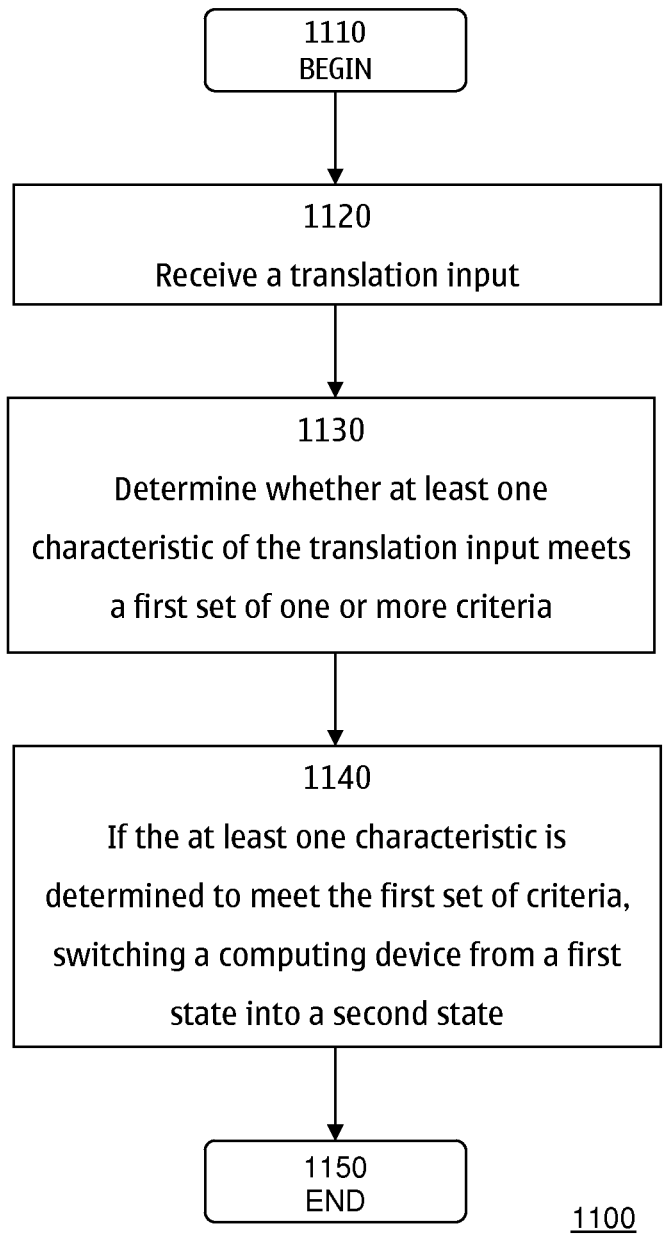
FIG. 11 is a flow chart illustrating a method according to another example of the invention.

FIG. 11 illustrates another example method 1100 for implementing functionality described above. On beginning 1110, the method starts with the reception 1120 of a translation input. It is then determined 1130 whether at least one characteristic of the translation input meets a first set of one or more criteria. If the at least one characteristic is determined to meet the first set of criteria, a computing device is switched 1240 from a first state into a second state. In the first state an application is in focus and a first display relating to the application is displayed, whereas in the second state the application is not in focus and a second display is displayed. The method then ends 1150.

Without in any way limiting the scope, interpretation, or application of the claims appearing below, a technical effect of one or more of the example embodiments disclosed herein is that an improved user experience is provided, in which fewer user input actions are required to complete operations.

Example embodiments of the present invention may be implemented in software, hardware, application logic or a combination of software, hardware and application logic. The software, application logic and/or hardware may reside on a removable memory, within internal memory or on a communication server. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with examples of a computer described and depicted in FIG. 1. A computer-readable medium may comprise a computer-readable storage medium that may be any media or means that can contain or store the instructions for use by or in connection with an instruction execution system, apparatus, or device, such as a computer.

In some example embodiments, the invention may be implemented as an apparatus or device, for example a mobile communication device (e.g. a mobile telephone), a PDA, a computer or other computing device, or a video game console.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. Apparatus comprising:
   at least one processor; and
   memory including computer program code configured to, working with the at least one processor, cause the apparatus to perform at least the following:
   causing a computing device, having a locked state in which a lock screen is displayed on a touch sensitive display and unlocked states, to launch an application and to display on the touch sensitive display a first display screen in which the application is in focus, in response to input registered by the touch sensitive display when the computing device is in an unlocked state, the application substantially filling the touch sensitive display; and
   causing, as a user provides a translation input across the touch sensitive display that is initiated while the application is in focus on the touch sensitive display, translation of the first display screen across the touch sensitive display with the translation input, wherein the translation input includes a touch input at a first location on the touch sensitive display that is continued to a second location on the touch sensitive display along a path, wherein at least one characteristic of the translation input meets a set of criteria corresponding to a length of the input, a direction of the input or relative locations of the first location and the second location on the touch sensitive display, and in response to a determination that the translation input meets the at least one characteristic, the translation of the first display screen reveals a second display screen which appears from beneath the first display screen wherein the application is not in focus on the second display screen and the application is displayable as a user-selectable representation of the application on the second display screen.

2. The apparatus of claim 1, wherein the first display screen substantially fills the touch sensitive display prior to the translation input being provided by the user.

3. The apparatus of claim 1, wherein the second display screen is a root navigation screen.

4. The apparatus of claim 1, wherein the translation input is a horizontal translation input.

5. The apparatus of claim 1, wherein the second display screen comprises a plurality of user selectable representations of applications currently running on the apparatus.

6. The apparatus of claim 5, wherein one of the user selectable representations relates to the application in focus in the first display screen.

7. The apparatus of claim 1, wherein the user provides the translation input by translating a finger across the touch sensitive display, and the first display screen is translated across the touch sensitive display with the user's finger.

8. The apparatus of claim 1, wherein the computer program code is configured to, working with the at least one processor, cause the apparatus to further perform: responding to the translation input provided to translate the first display screen across the touch sensitive display by terminating the application.

9. Apparatus comprising:
   at least one processor; and
   memory including computer program code configured to, working with the at least one processor, cause the apparatus to perform at least the following:
   causing a touch sensitive display of a computing device to display a lock screen when the computing device is in a locked state;
   responding to a translation input at the touch sensitive display while the lock screen is displayed by removing the lock screen from display on the touch sensitive display and switching the computing device from the locked state to an unlocked state;
   causing the computing device to launch an application on the computing device and to display on the touch sensitive display a display screen in which the application is in focus, in response to input registered by the touch sensitive display when the computing device is in the unlocked state, the application substantially filling the touch sensitive display;
   causing, as a user provides a translation input across the touch sensitive display that is initiated while the application is in focus on the touch sensitive display, translation of the first display screen across the touch sensitive display with the translation input, wherein the translation input includes a touch input at a first location on the touch sensitive display that is continued to a second location on the touch sensitive display along a path, wherein at least one characteristic of the translation input meets a set of criteria corresponding to a length of the input, a direction of the input or relative locations of the first location and the second location on the touch sensitive display, and in response to a determination that the translation input meets the at least one characteristic, the translation of the display screen reveals a further display screen which appears from beneath the display screen wherein the application is not in focus on the further display screen and the application is displayable as a user-selectable representation of the application on the further display screen.

10. The apparatus of claim 9, wherein the computer program code is configured to, working with the at least one processor, cause the apparatus to further perform: responding to the translation input provided to translate the first display screen across the touch sensitive display by terminating the application.

* * * * *

UNITED STATES PATENT AND TRADEMARK OFFICE
CERTIFICATE OF CORRECTION

Page 1 of 1

PATENT NO. : 8,854,318 B2
APPLICATION NO. : 12/874206
DATED : October 7, 2014
INVENTOR(S) : Borovsky et al.

It is certified that error appears in the above-identified patent and that said Letters Patent is hereby corrected as shown below:

In the Specification:

Column 5,
Line 33, "the icon will may be used" should read --the icon may be used--;
Line 63, "emphasised" should read --emphasized--.

Column 8,
Line 34, "less then" should read --less than--.

Column 9,
Line 25, "unlock" should read --lock--;
Line 50, "FIG. 10b" should read --FIG. 9b--.

Column 11,
Line 37, cancel "For example, when more than one".

Signed and Sealed this
Twenty-second Day of December, 2015

Michelle K. Lee
*Director of the United States Patent and Trademark Office*